(12) United States Patent
Ohara et al.

(10) Patent No.: US 10,409,000 B2
(45) Date of Patent: Sep. 10, 2019

(54) RESIN OPTICAL WAVEGUIDE

(71) Applicant: AGC Inc., Chiyoda-ku (JP)

(72) Inventors: Seiki Ohara, Tokyo (JP); Shotaro Takenobu, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/884,962

(22) Filed: Jan. 31, 2018

(65) Prior Publication Data

US 2018/0180806 A1 Jun. 28, 2018

Related U.S. Application Data

(63) Continuation of application No. PCT/JP2016/072523, filed on Aug. 1, 2016.

(30) Foreign Application Priority Data

Aug. 4, 2015 (JP) .................. 2015-154192

(51) Int. Cl.
| | |
|---|---|
| *G02B 6/122* | (2006.01) |
| *G02B 6/30* | (2006.01) |
| *G02B 6/12* | (2006.01) |
| *G02B 6/26* | (2006.01) |

(Continued)

(52) U.S. Cl.
CPC ............ *G02B 6/122* (2013.01); *G02B 1/048* (2013.01); *G02B 6/12* (2013.01); *G02B 6/1221* (2013.01); *G02B 6/26* (2013.01); *G02B 6/30* (2013.01); *G02B 1/046* (2013.01); *G02B 6/02033* (2013.01); *G02B 2006/12088* (2013.01); *G02B 2006/12147* (2013.01)

(58) Field of Classification Search
None
See application file for complete search history.

(56) References Cited

U.S. PATENT DOCUMENTS

| | | |
|---|---|---|
| 8,534,927 B1 | 9/2013 | Barwicz et al. |
| 8,724,937 B2 | 5/2014 | Barwicz et al. |
| 9,008,477 B2 | 4/2015 | Numata |
| (Continued) | | |

FOREIGN PATENT DOCUMENTS

| | | |
|---|---|---|
| JP | 1-225905 | 9/1989 |
| JP | 4-125602 | 4/1992 |
| (Continued) | | |

OTHER PUBLICATIONS

International Search Report dated Oct. 25, 2016 in PCT/JP2016/072523, filed on Aug. 1, 2016 (with English Translation).

(Continued)

*Primary Examiner* — Chad H Smith
(74) *Attorney, Agent, or Firm* — Oblon, McClelland, Maier & Neustadt, L.L.P.

(57) ABSTRACT

A resin optical waveguide containing a core, an under cladding and an over cladding having refractive indices lower than that of the core, in which the resin optical waveguide has, at one end side of, a core-exposed section at which the over cladding is not present and the core and the under cladding nearby the core are exposed and, of the under cladding, a portion corresponding to the core-exposed section has a first layer and a second layer that satisfy a certain condition.

8 Claims, 4 Drawing Sheets

(51) Int. Cl.
*G02B 1/04* (2006.01)
*G02B 6/02* (2006.01)

(56) References Cited

U.S. PATENT DOCUMENTS

| | | | |
|---|---|---|---|
| 2002/0191931 A1 | 12/2002 | Ferm et al. | |
| 2004/0005132 A1 | 1/2004 | Erben et al. | |
| 2004/0028314 A1* | 2/2004 | Lee | G02B 6/12004 385/14 |
| 2004/0037497 A1* | 2/2004 | Lee | G02B 6/1228 385/28 |
| 2006/0083472 A1* | 4/2006 | Sakai | B82Y 20/00 385/129 |
| 2009/0324163 A1* | 12/2009 | Dougherty | B82Y 20/00 385/14 |
| 2012/0002932 A1 | 1/2012 | Takenobu et al. | |
| 2013/0251304 A1 | 9/2013 | Barwicz et al. | |
| 2013/0251305 A1 | 9/2013 | Barwicz et al. | |
| 2014/0112616 A1 | 4/2014 | Numata | |

FOREIGN PATENT DOCUMENTS

| | | |
|---|---|---|
| JP | 6-34838 | 2/1994 |
| JP | 2002-122750 | 4/2002 |
| JP | 2006119659 | 5/2006 |
| JP | 2010-72463 | 4/2010 |
| JP | 2012-63620 | 3/2012 |
| JP | 2013-120338 | 6/2013 |
| JP | 2014-81586 | 5/2014 |
| WO | WO 2010/107005 A1 | 9/2010 |

OTHER PUBLICATIONS

Written Opinion dated Oct. 25, 2016 in PCT/JP2016/072523, filed on Aug. 1, 2016.
Jie Shu et al. "Efficient coupler between chip-level and board-level optical waveguides," Optics Letters, vol. 36, No. 18, Sep. 15, 2011, pp. 3.
Tymon Barwicz et al. "Low-Cost Interfacing of Fibers to Nanophotonic Waveguides: Design for Fabrication and Assembly Tolerances," IEEE Photonics Journal, vol. 6, No. 4, Aug. 2014, pp. 19.
EP Supplementary Search Report as received in the corresponding EP Patent Application No. EP16 83 2996 dated Feb. 26, 2019, 12 pages.
Roger Dangel, et al., "Polymer waveguides for electro-optical integration in data centers and high-performance computers", Optics Express, vol. 23, No. 4, Feb. 23, 2015, pp. 4736-4750.

* cited by examiner

[FIG. 1]
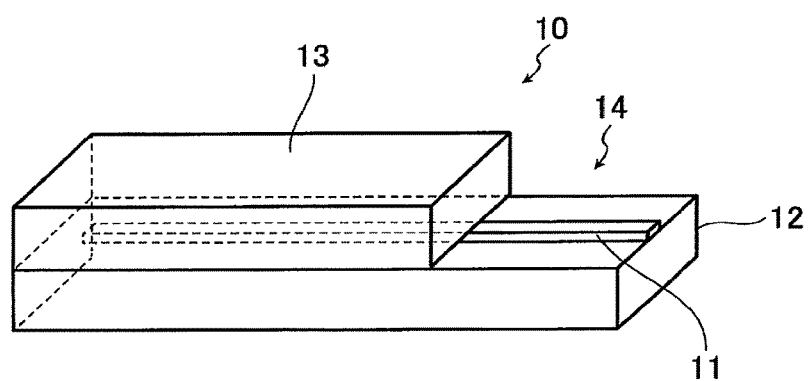
[FIG. 2]
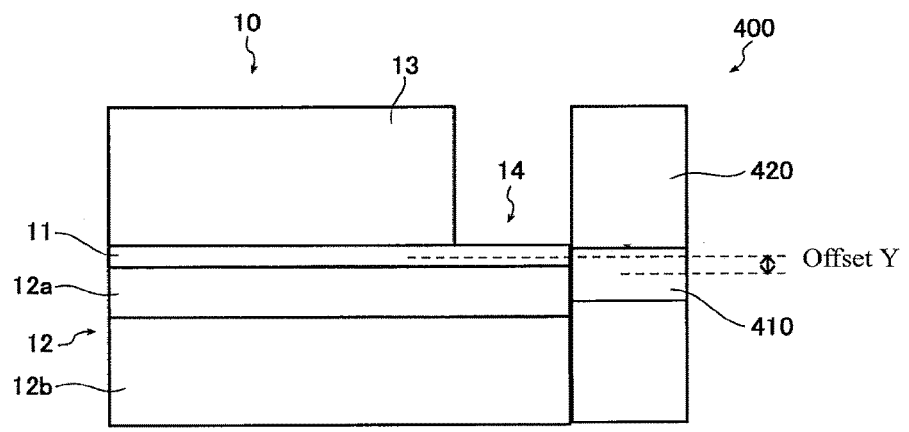

[FIG. 3]
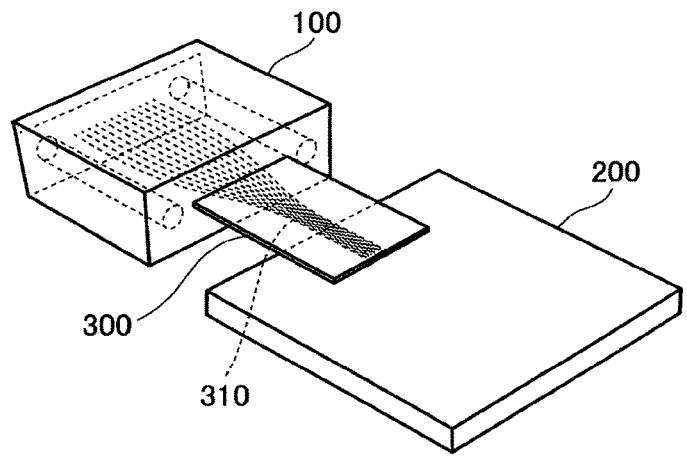
[FIG. 4]
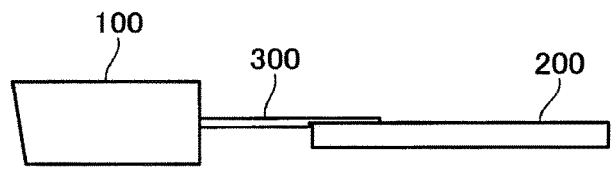
[FIG. 5]
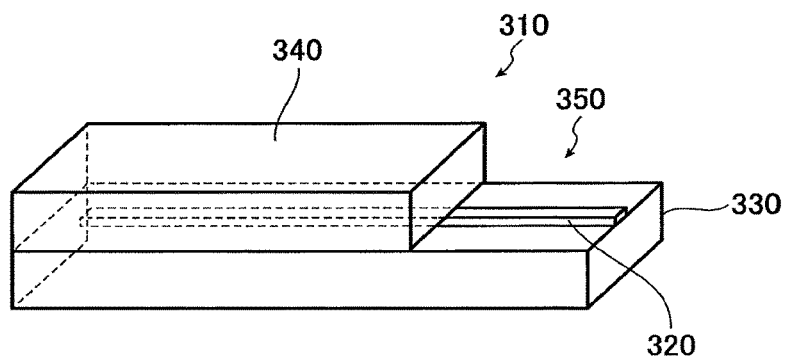

[FIG. 6]
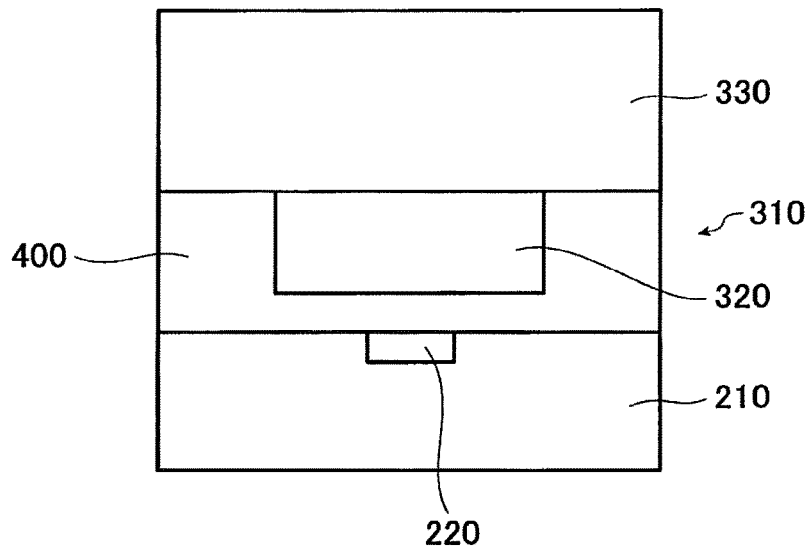
[FIG. 7]
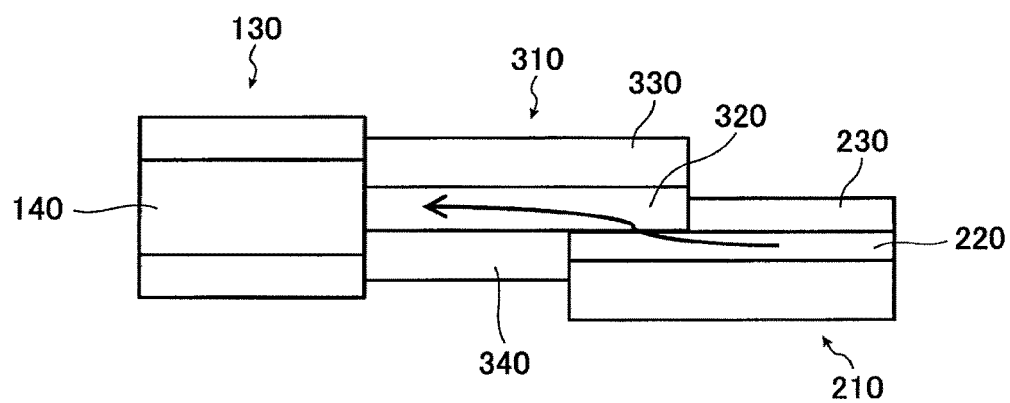

[FIG. 8]
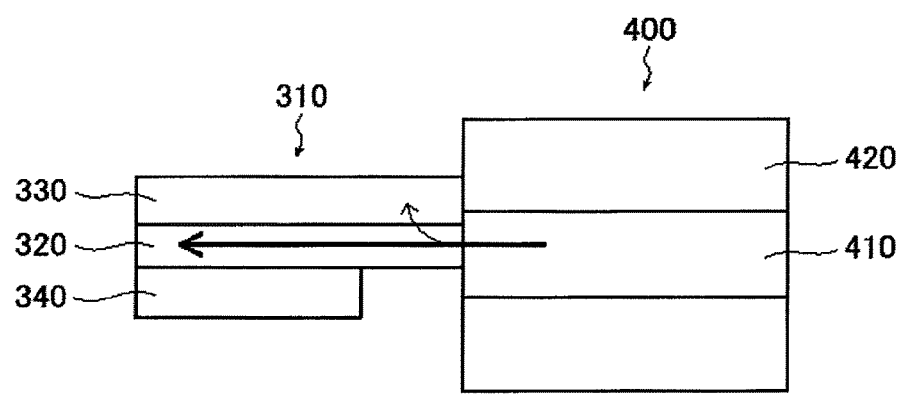

US 10,409,000 B2

RESIN OPTICAL WAVEGUIDE

TECHNICAL FIELD

The present invention relates to a resin optical waveguide.

BACKGROUND ART

Non-Patent Documents 1 and 2 and Patent Document 1 propose a silicon photonics interface in which a silicon optical waveguide is connected to a resin optical waveguide with low loss and at low cost. The silicon optical waveguide referred to in the present Description has a core-clad structure that functions as a (single-mode) optical waveguide formed on a silicon chip.

FIG. 3 is a perspective view illustrating a configuration example of such a silicon photonics interface and FIG. 4 is a side view thereof.

In a resin optical waveguide chip 300 illustrated in FIGS. 3 and 4, one or a plurality of resin optical waveguides 310 are formed. At one end side of the resin optical waveguide chip 300, the resin optical waveguide(s) 310 is (are) connected to a silicon optical waveguide (not illustrated) formed on a silicon optical waveguide chip 200. Another end side of the resin optical waveguide chip 300 is housed in a connector 100.

FIG. 5 is a perspective view illustrating a configuration example of the resin optical waveguide to be used for the above purpose.

The resin optical waveguide 310 illustrated in FIG. 5 has an under cladding 330 and an over cladding 340 provided around a core 320. However, the tip of the side with which the silicon optical waveguide (not illustrated) formed on the silicon optical waveguide chip 200 is to be connected in FIGS. 3 and 4 has no over cladding 340 provided, and forms a core-exposed section 350 where the core 320 is exposed to the outside.

FIG. 6 is a cross-sectional view illustrating a connecting part between the silicon optical waveguide 210 and the resin optical waveguide 310 in the silicon photonics interface illustrated in FIGS. 3 and 4. The resin optical waveguide 310 is the resin optical waveguide 310 illustrated in FIG. 5. In FIG. 6, the silicon optical waveguide 210 and the resin optical waveguide 310 are connected by using an epoxy resin in a state that the core 320 of the resin optical waveguide 310 faces to the silicon optical waveguide 210.

FIG. 7 is a schematic view for explaining light propagation in the silicon photonics interface illustrated in FIGS. 3 and 4. In FIG. 7, light is propagated from a core 220 of the silicon optical waveguide 210 to the core 320 exposed at the tip of the resin optical waveguide 310 by adiabatic coupling. Then, the light is propagated from the core 320 of the resin optical waveguide 310 to a core 140 of an optical fiber 130.

PRIOR ART DOCUMENT

Non-Patent Document

Non-Patent Document 1: Jie Shu, Ciyuan Qiu, Xuezhi Zhang, and Qianfan Xu, "Efficient coupler between chip-level and board-level optical waveguides", OPTICS LETTERS, Vol. 36. No. 18, pp 3614-3616 (2011)

Non-Patent Document 2: Tymon Barwics, and Yoichi Taira, "Low-Cost Interfacing of Fibers to Nanophotonic Waveguides: Design for Fabrication and Assembly Tolerances", IEEE Photonics Journal, Vol. 6, No. 4, August, 660818 (2014)

Patent Document

Patent Document 1: U.S. Pat. No. 8,724,937

SUMMARY OF THE INVENTION

Problems that the Invention is to Solve

The resin optical waveguide 310 illustrated in FIG. 5 is subjected to performance evaluation with the same procedure as in the case of conventional resin optical waveguide before being mounted on the silicon photonics interface illustrated in FIGS. 3 and 4. In the performance evaluation of the resin optical waveguide, a single-mode optical fiber is connected to a tip of the resin optical waveguide. FIG. 8 is a schematic view for explaining light propagation in the case where a single-mode optical fiber is connected to a tip of the resin optical waveguide 310 illustrated in FIG. 5. In the connection of the resin optical waveguide 310 illustrated in FIG. 5 and the single-mode optical fiber 400, a part of the light is emitted from the portion at which the core 320 at the tip of the resin optical waveguide 310 is exposed and is not propagated, and also there is a problem where connection loss occurs. This connection loss does not occur at the time of mounting on the silicon photonics interface illustrated in FIGS. 3 and 4 and thus, lowers the reliability of the results of the performance evaluation.

In order to solve the problems of the conventional art described above, an object of the present invention is to provide a resin optical waveguide which is suitable for the use in a silicon photonics interface in which a silicon optical waveguide is connected to the resin optical waveguide with low loss and at low cost, and which exhibits high reliability of performance evaluation using a single-mode optical fiber.

Means for Solving the Problems

In order to achieve the object described above, the present invention provides a resin optical waveguide containing a core, an under cladding and an over cladding having refractive indices lower than that of the core, in which the resin optical waveguide has, at one end side thereof, a core-exposed section at which the over cladding is not present and the core and the under cladding nearby the core are exposed and, of the under cladding, a portion corresponding to the core-exposed section has a first layer and a second layer that satisfy the following (1) to (3):

(1) the first layer and the second layer differ from each other in a distance from an interface with the core or an exposed surface of the under cladding, and the first layer is positioned on a near side to these surfaces and the second layer is positioned on a far side from these surfaces;

(2) the first layer is positioned within 15 μm in the distance from the interface with the core or the exposed surface of the under cladding; and (3) the first layer and the second layer differ from each other in refractive index, and the first layer has the refractive index higher than that of the second layer.

In the resin optical waveguide of the present invention, the core-exposed section has a length of preferably 100 μm or more in a light propagation direction.

The resin optical waveguide of the present invention preferably has a difference ($n_{1,max}$-$n_{2,max}$) between the maximum value $n_{1,max}$ of the refractive index of the first layer and the maximum value $n_{2,max}$ of the refractive index of the second layer being 0.001 or more.

In the resin optical waveguide of the present invention, the first layer has a thickness t of preferably 15 µm or less.

The resin optical waveguide of the present invention preferably has a product ($t \times (n_{1,max} - n_{2,max})$) of the thickness t of the first layer and the difference ($n_{1,max} - n_{2,max}$) between the maximum value $n_{1,max}$ of the refractive index of the first layer and the maximum value $n_{2,max}$ of the refractive index of the second layer being from 0.001 to 0.2 µm.

The resin optical waveguide of the present invention preferably has a difference ($n'_{max} - n_{1,max}$) between the maximum value $n'_{max}$ of the refractive index of the core and the maximum value $n_{1,max}$ of the refractive index of the first layer being from 0.008 to 0.02.

In the resin optical waveguide of the present invention, the under cladding has a thickness of preferably 10 µm or more.

The resin optical waveguide of the present invention is preferably a single-mode optical waveguide at a wavelength of at least one of 1,310 nm and 1,550 nm.

In the resin optical waveguide of the present invention, the resin optical waveguide has a core size of preferably from 1 to 10 µm.

In the resin optical waveguide of the present invention, the core of the resin optical waveguide is preferably composed of a resin containing fluorine.

Moreover, the present invention provides a resin optical waveguide containing a core, an under cladding having a refractive index lower than that of the core and an over cladding, in which the resin optical waveguide has, at one end side thereof, a core-exposed section at which the over cladding is not present and the core and the under cladding nearby the core are exposed is provided, and the core-exposed section has a length of 500 µm or more in a light propagation direction of the resin optical waveguide and, of the under cladding, a portion corresponding to the core-exposed section has a first layer and a second layer that satisfy the following (1) to (4):

(1) the first layer and the second layer differ from each other in a distance from an interface with the core or an exposed surface of the under cladding, and the first layer is positioned on a near side to these surfaces and the second layer is positioned on a far side from these surfaces;

(2) the first layer is positioned within 8 µm in the distance from the interface with the core or the exposed surface of the under cladding;

(3) the first layer and the second layer differ from each other in refractive index, and the first layer has a refractive index higher than that of the second layer; and (4) a difference ($n_{1,max} - n_{2,max}$) between the maximum value $n_{1,max}$ of the refractive index of the first layer and the maximum value $n_{2,max}$ of the refractive index of the second layer is 0.002 or more.

The resin optical waveguide of the present invention is preferably connected with a silicon optical waveguide at the core-exposed section.

Advantageous Effect of the Invention

The resin optical waveguide of the present invention is suitable for the use in a silicon photonics interface in which a silicon optical waveguide is connected to a resin optical waveguide with low loss and at low cost.

The resin optical waveguide of the present invention exhibits low connection loss during performance evaluation using a single-mode optical fiber and thus the performance evaluation is highly reliable.

BRIEF DESCRIPTION OF DRAWINGS

FIG. 1 is a perspective view illustrating a configuration example of the resin optical waveguide of the present invention.

FIG. 2 is a schematic view illustrating a connecting part between a resin optical waveguide and a single-mode optical fiber in Examples.

FIG. 3 is a perspective view illustrating a configuration example of a silicon photonics interface.

FIG. 4 is a side view of the silicon photonics interface of FIG. 3.

FIG. 5 is a perspective view illustrating a configuration example of the resin optical waveguide for use in the silicon photonics interface of FIGS. 3 and 4.

FIG. 6 is a cross-sectional view illustrating a connecting part between a silicon optical waveguide and a resin optical waveguide 310 formed on a silicon optical waveguide chip 200 in the silicon photonics interface illustrated in FIGS. 3 and 4.

FIG. 7 is a schematic view for explaining light propagation in the silicon photonics interface illustrated in FIGS. 3 and 4.

FIG. 8 is a schematic view for explaining light propagation when a single-mode optical fiber is connected to the tip of the resin optical waveguide 310 illustrated in FIG. 5.

MODE FOR CARRYING OUT THE INVENTION

The following will explain the present invention with reference to Drawings.

FIG. 1 is a perspective view illustrating a configuration example of the resin optical waveguide of the present invention. The resin optical waveguide 10 illustrated in FIG. 1 contains a core 11, an under cladding 12 having a refractive index lower than that of the core 11 and an over cladding 13 also having a refractive index lower than that of the core 11. The under cladding 12 is provided under the core 11 and the over cladding 13 is provided over the core 11. However, a core-exposed section 14 at which the over cladding 13 is not present and the core 11 is exposed is provided at one end side of the resin optical waveguide 10.

In the resin optical waveguide of the present invention, of the under cladding and over cladding provided around the core, the one that is not present at the core-exposed section is regarded as the over cladding. Therefore, the under cladding may be provided over the core and the over cladding may be provided under the core.

The core-exposed section 14 is to be a connecting portion with a silicon optical waveguide when the resin optical waveguide 10 is used in a silicon photonics interface. Therefore, the core-exposed section 14 is required to have a sufficient length for the use as the connecting portion with the silicon optical waveguide. In the resin optical waveguide 10 of the present invention, the length of the core-exposed section 14 in a light propagation direction of the resin optical waveguide is preferably 100 µm or more, which is a sufficient length for the use as the connecting portion with the silicon optical waveguide. Incidentally, the light propagation direction of the resin optical waveguide is the long axis direction of the core 11.

In the core-exposed section 14, the length in the light propagation direction of the resin optical waveguide is more preferably 300 µm or more, further preferably 500 µm or more, and even further preferably 1,000 µm or more.

However, in the case where the length of the core-exposed section 14 in the light propagation direction of the resin optical waveguide is too long, there is a concern that the connection loss may increase when connecting with a silicon optical waveguide by using an adhesive (e.g., an epoxy resin), due to absorption of the adhesive. Therefore, the length of the core-exposed section 14 in the light propagation direction of the resin optical waveguide is preferably 10,000 μm or less, more preferably 5,000 μm or less, and further preferably 3,000 μm or less.

In the resin optical waveguide 10, the refractive indices of the under cladding 12 and the over cladding 13 are made lower than that of the core 11 for preventing the light propagated through the core 11 from emitting to the under cladding 12 side or to the over cladding 13 side.

As mentioned above, when the resin optical waveguide 310 having the core-exposed section is connected to the single-mode optical fiber 400 as illustrated in FIG. 8, the core 320 is in an exposed state at the core-exposed section where the over cladding 340 is not present. Since the performance evaluation of the resin optical waveguide 310 is performed under a condition that the core-exposed section is present in air or in water, the exposed surface of the core 320 comes into contact with air or water. But air or water has a refractive index smaller than those of the materials of the core 320 and the under cladding 330 of the resin optical waveguide 310. As a result, a part of the light propagated through the core 320 is emitted to the under cladding 330 side, which is a cause of the connection loss.

In the resin optical waveguide 10 of the present invention, of the under cladding 12, the portion corresponding to the core-exposed section 14 has a first layer and a second layer, which satisfy the following (1) to (3). Therefore, the connection loss at the time of connection with a single-mode optical fiber is suppressed:

(1) the first layer and the second layer differ from each other in distance from the interface with the core or the exposed surface of the under cladding, and the first layer is positioned on a near side to these surfaces and the second layer is positioned on a far side from these surfaces;
(2) the first layer is positioned within 15 μm in the distance from the interface with the core or the exposed surface of the under cladding;
(3) the first layer and the second layer differ from each other in refractive index, and the first layer has a refractive index higher than that of the second layer.

As suggested in the above (1), of the under cladding 12, the portion corresponding to the core-exposed section 14 has a bilayer structure in which the near side to the interface with the core 11 or the exposed surface of the under cladding 12 is the first layer and the far side from these surfaces is the second layer. Incidentally, the interface with the core 11 and the exposed surface of the under cladding 12 form a part of the first layer.

As suggested in the above (3), the first layer has a refractive index higher than that of the second layer. Such a bilayer structure suppresses the emission of the light propagated through the core 11 to the under cladding 12 side in the core-exposed section 14 and thus, suppresses the connection loss at the time of the connection with a single-mode optical fiber.

As suggested in the above (2), the first layer is positioned within 15 μm in a distance from the interface with the core 11 or the exposed surface of the under cladding 12. Therefore, the thickness t of the first layer is 15 μm or less. The reason why the distance from the interface with the core 11 or the exposed surface of the under cladding 12 is controlled to 15 μm or less is as follows.

In the case where the distance from the interface with the core 11 or the exposed surface of the under cladding 12 is controlled to 15 μm or less, the emission of the light propagated through the core 11 to the under cladding 12 side is suppressed and thus the connection loss at the time of the connection with a single-mode optical fiber is suppressed.

In the first layer, the distance from the interface with the core 11 or the exposed surface of the under cladding 12 is preferably 10 μm or less, more preferably 8 μm or less, and further preferably 6 μm or less. Therefore, the thickness t of the first layer is preferably 10 μm or less, more preferably 8 μm or less, and further preferably 6 μm or less.

However, in the first layer, too small distance from the interface with the core 11 or the exposed surface of the under cladding 12 makes insufficient the suppression of the emission of the light propagated through the core 11 to the under cladding 12 side. In the first layer, the distance from the interface with the core 11 or the exposed surface of the under cladding 12 is preferably 0.1 μm or more, more preferably 0.2 μm or more, and further preferably 0.5 μm or more. Therefore, the thickness t of the first layer is preferably 0.1 μm or more, more preferably 0.2 μm or more, and further preferably 0.5 μm or more.

In order to suppress the connection loss at the time of the connection with a single-mode optical fiber, the difference $(n_{1,max}-n_{2,max})$ between the maximum value $n_{1,max}$ of the refractive index of the first layer and the maximum value $n_{2,max}$ of the refractive index of the second layer is preferably 0.001 or more. $n_{1,max}-n_{2,max}$ being 0.001 or more provides the aforementioned effect of suppressing the connection loss at the time of the connection with a single-mode optical fiber, preferably. $n_{1,max}-n_{2,max}$ is preferably 0.002 or more and more preferably 0.004 or more.

Incidentally, an upper limit value of the difference $(n_{1,max}-n_{2,max})$ between the maximum value $n_{1,max}$ of the refractive index of the first layer and the maximum value $n_{2,max}$ of the refractive index of the second layer is not particularly limited but, for example, may be set to 0.020 owing to the production method or the like to be mentioned later.

Here, the difference between the maximum value $n_{1,max}$ of the refractive index of the first layer and the maximum value $n_{2,max}$ of the refractive index of the second layer is used because a case where the first layer and the second layer are each separated into a plurality of layers having different refractive indices each other is considered. In this case, it is required for the plurality of layers constituting the first layer and the plurality of layers constituting the second layer that a nearer side to the interface with the core or the exposed surface of the under cladding has a higher refractive index and a farther side from these surfaces has a lower refractive index. Moreover, it is required for the plurality of the layers constituting the first layer that the largest value of the difference in the refractive indices is less than 0.001.

In order to suppress the connection loss at the time of connection with a single-mode optical fiber, the product $(t \times (n_{1,max}-n_{2,max}))$ of the thickness t of the first layer and the difference $(n_{1,max}-n_{2,max})$ between the maximum value $n_{1,max}$ of the refractive index of the first layer and the maximum value $n_{2,max}$ of the refractive index of the second layer is preferably from 0.001 to 0.2 μm. The product is more preferably from 0.004 to 0.15 μm and particularly preferably from 0.004 to 0.12 μm.

In view of suppression of the connection loss with a silicon optical waveguide and suppression of the connection loss at the time of connecting with a single-mode optical fiber, the difference $(n'_{max}-n_{max})$ between the maximum value $n'_{max}$ of the refractive index of the core 11 and the maximum value $n_{max}$ of the refractive index of the first layer is preferably from 0.008 to 0.02. Here, the maximum value $n'_{max}$ of the refractive index of the core 11 is used because a case where refractive index distribution is present also in the core 11 is considered.

$n'_{max}$-$n_{max}$ is more preferably from 0.010 to 0.015.

The thickness of the under cladding 12 is preferably 10 μm or more in order to increase rigidity and improve easiness of handling. The thickness of the under cladding 12 is more preferably 15 μm or more and further preferably 20 μm or more. In the case where the under cladding 12 is composed of the first layer and the second layer, the emission of light can be suppressed in any thickness as long as the second layer has a refractive index lower than that of the first layer. The thickness is preferably 70 μm or less and further preferably 50 μm or less in terms of productivity.

In the resin optical waveguide of the present invention, the refractive index of the under cladding 12 at the portion where the over cladding 13 and the under cladding 12 are provided over and under the core 11 is not particularly limited as long as the numerical value is lower than the refractive index of the core 11. Therefore, for example, the under cladding 12 at the portion may have a refractive index of an equal numerical value as a whole, or may have a portion where the refractive index is different between at the near side and at the far side with respect to the core 11. However, such a portion is required to have a higher refractive index at the near side to the core 11 and a lower refractive index at the far side from the core 11. Furthermore, the portion may have the same configuration as the first layer and the second layer which satisfy the above (1) to (3).

The resin optical waveguide of the present invention will be further described.

(Core 11)

In the resin optical waveguide 10 illustrated in FIG. 1, the cross-sectional shape of the core 11 is rectangular, but the shape is not limited thereto and may be, for example, trapezoidal, circular or elliptic. In the case where the cross-sectional shape of the core 11 is polygonal, the corners may be rounded.

The core size is not particularly limited and can be appropriately designed in consideration of a light source, coupling efficiency with a light receiving element, or the like. The coupling efficiency depends on the core diameter and the numerical aperture (NA). For example, the core size (in the case where the cross-sectional shape of the core 11 is rectangular as in the case of the core 11 illustrated in FIG. 1, width and height of the rectangle) of the core 11 is preferably from 1 to 10 μm in terms of the coupling efficiency with a silicon optical waveguide to be connected at the time of the use in a silicon photonics interface. The core size is more preferably from 1.5 to 8 μm and further preferably from 2 to 7 μm. Here, the width of the rectangle is the length of the width at the central position of the height and the height of the rectangle is the length of the height at the central position of the width. Incidentally, the core size may change in a tapered manner along the light propagation direction of the resin optical waveguide.

The core 11 may have such refractive index distribution that the refractive index decreases toward the far side with respect to the center of the core. Also, the core may have such refractive index distribution that the refractive index at the over cladding side is higher and the refractive index at the under cladding side is lower or such refractive index distribution that the refractive index at the over cladding side is lower and the refractive index at the under cladding side is higher.

Here, the maximum value $n'_{max}$ of the refractive index of the core 11 is used because, for example, as mentioned above, the case where refractive index distribution is present also in the core 11 is considered.

(Over Cladding 13)

The over cladding 13 is not particularly limited as long as it has a refractive index lower than that of the core 11. Therefore, the over cladding 13 may have a refractive index of an equal numerical value as a whole. Alternatively, the over cladding 13 may have a portion where the refractive indices are different between at the near side and at the far side with respect to the core 11. In this case, the over cladding 13 may have a configuration where the refractive index decreases toward the far side with respect to the core 11 or may have a configuration where the refractive index increases toward the far side with respect to the core 11.

The thickness of the over cladding 13 is not particularly limited. However, in the case where the resin optical waveguide 10 of the present invention is a single-mode optical waveguide, a propagated light leaks also to the clad part existing within the range of about 10 μm from the center of the core 11. Therefore, the thickness is preferably 10 μm or more from the viewpoint of decreasing the propagation loss of light. Moreover, the total thickness of the under cladding 12 and the over cladding 13 is preferably from 20 to 90 μm and more preferably from 30 to 70 μm.

In the resin optical waveguide of the present invention, constituting materials of the core 11, the under cladding 12 and the over cladding 13 are not particularly limited as long as they satisfy the required properties as the resin optical waveguide. However, the constituting material of the core 11 is preferably a resin containing fluorine in view of suppressing the loss of the light propagated through the core 11.

Moreover, with regard to the constituting materials of the core 11, the under cladding 12 and the over cladding 13 and the production procedures of the resin optical waveguide, for example, the descriptions in the following literatures can be referenced.

WO 2010/107005
JP-A-2013-120338
JP-A-2012-63620

In the case where the resin optical waveguide 10 of the present invention illustrated in FIG. 1 is produced with reference to the above literatures, the core-exposed section 14 of the resin optical waveguide 10 can be formed by the following procedure.

An under cladding is formed and a core is formed on the under cladding by using a photolithography process. And then, a curable composition is applied on the under cladding and the core and the curable resin composition is cured by heating and/or light irradiation to form an over cladding. At the time of forming the over cladding layer, a region having the over cladding and a region where the over cladding is absent and the core is exposed (i.e., a core-exposed section) can be formed by using a photolithography process.

Furthermore, the under cladding 12 having a first layer 12a and a second layer 12b which satisfy the above (1) to (3) can be formed by the following procedure.

The under cladding 12 having the first layer 12a and the second layer 12b can be formed by adjusting heating temperature and heating time and/or by adjusting irradiation intensity and irradiation time of light at the time of forming the under cladding as above. Alternatively, the under cladding 12 having the first layer 12a and the second layer 12b can be formed by adding a dopant for adjusting the refractive index. Also, the under cladding 12 having the first layer 12a and the second layer 12b can be formed by applying a curable composition (b) to form the under cladding 12b, performing heating and/or light irradiation to cure the composition, applying a curable composition (a) to form the under cladding 12a thereon, and performing heating and/or light irradiation to cure the composition. For the curable composition (a) and the curable composition (b), materials described in the above-mentioned literatures can be appropriately used.

In the case where the refractive index is adjusted by dopant addition, the refractive index depends on the material constituting the under cladding and the kind of the dopant. Therefore, the dopant is appropriately selected depending on the material constituting the under cladding to obtain the target refractive index.

For the use in a silicon photonics interface in which a silicon optical waveguide is connected to an optical fiber with low loss and at low cost, the resin optical waveguide of the present invention is preferably a single-mode optical waveguide since optical signals can be highly densified. In this case, the resin optical waveguide is preferably the single-mode optical waveguide at a wavelength of at least one of 1,310 nm and 1,550 nm since it can propagate light also to a silicon optical waveguide and a single-mode optical fiber with low loss.

In the case where the resin optical waveguide of the present invention is used in a silicon photonics interface, the resin optical waveguide is connected with the silicon optical waveguide at the core-exposed section thereof.

EXAMPLES

The following will describe the present invention in further detail with reference to Examples but the present invention should not be construed as being limited to these Examples.

In Examples described below, the structures (size and refractive index) of a resin optical waveguide and a single-mode optical fiber were defined by RSoft CAD manufactured by RSoft Design Group Inc. and simulation of light propagation was performed by BeamProp (finite difference beam propagation method) that is a simulation engine manufactured by RSoft Design Group Inc. FIG. 2 is a schematic view illustrating a connecting part between the resin optical waveguide and the single-mode optical fiber in Examples.

Examples 1 to 40

Of Examples 1 to 40, Examples 1 to 7, 9 to 23, and Examples 25 to 40 are Working Examples and each under cladding 12 had a bilayer structure of a first layer and a second layer. Example 8 and Example 24 are Comparative Examples and each under cladding had a structure of a first layer alone.

The structures of the resin optical waveguide and the single-mode optical fiber were defined by RSoft CAD as shown below.
(Single-mode optical fiber 400)
Core 410
  Core diameter: 8.4 μm
  Refractive index: 1.47
Clad 420
  Clad diameter: 80 μm
  Refractive index: 1.4652
(Resin optical waveguide 10)
Single-mode optical waveguide
Core 11
  Core size: 5.9 μm in the width direction, 2.3 μm in the longitudinal direction
  Refractive index: 1.534
Under cladding 12
  Thickness: 40 μm
  First layer 12a
    Refractive index: 1.52
    Thickness t: 2 to 14 μm
  Second layer 12b
    Difference in refractive index between the first layer 12a and the second layer 12b: 0 to 0.015
  In Example 8 and Example 24, the under cladding 12 does not have a bilayer structure and the refractive index of the whole under cladding 12 is 1.52.
Over cladding 13
  Refractive index: 1.52
  Thickness: 40 μm
  Core-exposed section 14
Length in the light propagation direction of the resin optical waveguide 10: 2,000 μm.

Under a condition that the core-exposed section 14 was filled with water (refractive index: 1.32) or air (refractive index: 1.00), connection loss at a wavelength of 1.55 μm was determined through calculation by BeamProp. The results are shown in the following tables. In the tables, of the refractive index $(n_1-n_2)$, the refractive index of the first layer 12a is denoted as $n_1$ and the refractive index of the second layer 12b is denoted as $n_2$. The thickness in the tables is thickness of the first layer 12a. Moreover, offset Y between the core 11 of the optical waveguide 10 and the core 410 of the single-mode optical fiber 400 is as illustrated in FIG. 2. The index in the tables is as shown in the following table.

TABLE 1

| Index | Connection loss |
|---|---|
| 5 | 5 dB or less |
| 4 | more than 5 dB, 10 dB or less |
| 3 | more than 10 dB, 15 dB or less |
| 2 | more than 15 dB, 20 dB or less |
| 1 | more than 20 dB |

TABLE 2

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Difference in refractive index $(n_1-n_2)$ | 0.002 | 0.020 | 0.020 | 0.005 | 0.005 | 0.005 | 0.005 | 0.000 |
| Thickness t of first layer (μm) | 2.0 | 4.0 | 6.0 | 2.0 | 6.0 | 10.0 | 14.0 | 0.0 |
| $(n_1-n_2)$ × thickness t (μm) | 0.004 | 0.080 | 0.120 | 0.010 | 0.030 | 0.050 | 0.070 | 0.000 |
| Condition of core-exposed section | water | water | water | water | water | water | water | water |

TABLE 2-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Connection loss (dB) | 4.7 | 5.0 | 5.7 | 4.4 | 4.9 | 7.1 | 13.4 | >30 |
| Index | 5 | 5 | 4 | 5 | 5 | 4 | 3 | 1 |

TABLE 3

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Difference in refractive index ($n_1$-$n_2$) | 0.010 | 0.010 | 0.010 | 0.010 | 0.015 | 0.015 | 0.015 | 0.015 |
| Thickness t of first layer (μm) | 2.0 | 4.0 | 6.0 | 8.0 | 2.0 | 4.0 | 6.0 | 8.0 |
| ($n_1$-$n_2$) × thickness t (μm) | 0.020 | 0.040 | 0.060 | 0.080 | 0.030 | 0.060 | 0.090 | 0.120 |
| Condition of core-exposed section | water | water | water | water | water | water | water | water |
| Connection loss (dB) | 4.6 | 4.4 | 4.7 | 5.4 | 4.8 | 4.4 | 4.6 | 5.3 |
| Index | 5 | 5 | 5 | 4 | 5 | 5 | 5 | 4 |

TABLE 4

|  | Ex. 17 | Ex. 18 | Ex. 19 | Ex. 20 | Ex. 21 | Ex. 22 | Ex. 23 | Ex. 24 |
|---|---|---|---|---|---|---|---|---|
| Difference in refractive index ($n_1$-$n_2$) | 0.002 | 0.020 | 0.020 | 0.005 | 0.005 | 0.005 | 0.005 | 0.000 |
| Thickness t of first layer (μm) | 2.0 | 4.0 | 6.0 | 2.0 | 6.0 | 10.0 | 14.0 | 0.0 |
| ($n_1$-$n_2$) × thickness t (μm) | 0.004 | 0.080 | 0.120 | 0.010 | 0.030 | 0.050 | 0.070 | 0.000 |
| Condition of core-exposed section | air | air | air | air | air | air | air | air |
| Connection loss (dB) | 7.6 | 6.6 | 7.8 | 5.0 | 6.1 | 11.3 | 18.5 | >30 |
| Index | 4 | 4 | 4 | 5 | 4 | 3 | 2 | 1 |

TABLE 5

|  | Ex. 25 | Ex. 26 | Ex. 27 | Ex. 28 | Ex. 29 | Ex. 30 | Ex. 31 | Ex. 32 |
|---|---|---|---|---|---|---|---|---|
| Difference in refractive index ($n_1$-$n_2$) | 0.010 | 0.010 | 0.010 | 0.010 | 0.015 | 0.015 | 0.015 | 0.015 |
| Thickness t of first layer (μm) | 2.0 | 4.0 | 6.0 | 8.0 | 2.0 | 4.0 | 6.0 | 8.0 |
| ($n_1$-$n_2$) × thickness t (μm) | 0.020 | 0.040 | 0.060 | 0.080 | 0.030 | 0.060 | 0.090 | 0.120 |
| Condition of core-exposed section | air | air | air | air | air | air | air | air |
| Connection loss (dB) | 5.1 | 5.0 | 5.7 | 7.3 | 5.3 | 5.0 | 5.5 | 7.0 |
| Index | 4 | 5 | 4 | 4 | 4 | 5 | 4 | 4 |

TABLE 6

|  | Ex. 33 | Ex. 34 | Ex. 35 | Ex. 36 | Ex. 37 | Ex. 38 | Ex. 39 | Ex. 40 |
|---|---|---|---|---|---|---|---|---|
| Difference in refractive index ($n_1$-$n_2$) | 0.005 | 0.005 | 0.005 | 0.005 | 0.005 | 0.005 | 0.005 | 0.005 |
| Thickness t of first layer (μm) | 4.0 | 4.0 | 4.0 | 4.0 | 4.0 | 4.0 | 4.0 | 4.0 |
| ($n_1$-$n_2$) × thickness t (μm) | 0.020 | 0.020 | 0.020 | 0.020 | 0.020 | 0.020 | 0.020 | 0.020 |
| Condition of core-exposed section | water | water | water | water | air | air | air | air |
| Offset Y (μm) | 0 | 2 | 4 | 6 | 0 | 2 | 4 | 6 |
| Connection loss (dB) | 4.5 | 3.3 | 4.2 | 6.8 | 5.2 | 3.7 | 4.2 | 6.4 |
| Index | 5 | 5 | 5 | 4 | 4 | 5 | 5 | 4 |

The above Tables 1 to 6 show Examples where the length of the core-exposed section 14 in the light propagation direction was set to 2,000 µm. Table 7 and Table 8 below show results of Examples where the length of the core-exposed section 14 was set to 500 µm, 1,000 µm, 1,500 µm, or 3,000 µm.

TABLE 7

|  | Ex. 41 | Ex. 42 | Ex. 43 | Ex. 44 | Ex. 45 | Ex. 46 | Ex. 47 | Ex. 48 |
|---|---|---|---|---|---|---|---|---|
| Difference in refractive index ($n_1$-$n_2$) | 0.005 | 0.005 | 0.005 | 0.005 | 0.005 | 0.005 | 0.005 | 0.005 |
| Thickness t of first layer (µm) | 4.0 | 4.0 | 4.0 | 4.0 | 4.0 | 4.0 | 4.0 | 4.0 |
| ($n_1$-$n_2$) × thickness t (µm) | 0.020 | 0.020 | 0.020 | 0.020 | 0.020 | 0.020 | 0.020 | 0.020 |
| Condition of core-exposed section | air | air | air | air | air | air | air | air |
| Length of core-exposed section (µm) | 500 | 500 | 500 | 500 | 1000 | 1000 | 1000 | 1000 |
| Offset Y (µm) | 0 | 2 | 4 | 6 | 0 | 2 | 4 | 6 |
| Connection loss | 5.1 | 3.8 | 4.5 | 6.9 | 5.2 | 3.8 | 4.4 | 6.7 |
| Index | 4 | 5 | 5 | 4 | 4 | 5 | 5 | 4 |

TABLE 8

|  | Ex. 49 | Ex. 50 | Ex. 51 | Ex. 52 | Ex. 53 | Ex. 54 | Ex. 55 | Ex. 56 |
|---|---|---|---|---|---|---|---|---|
| Difference in refractive index ($n_1$-$n_2$) | 0.005 | 0.005 | 0.005 | 0.005 | 0.005 | 0.005 | 0.005 | 0.005 |
| Thickness t of first layer (µm) | 4.0 | 4.0 | 4.0 | 4.0 | 4.0 | 4.0 | 4.0 | 4.0 |
| ($n_1$-$n_2$) × thickness t (µm) | 0.020 | 0.020 | 0.020 | 0.020 | 0.020 | 0.020 | 0.020 | 0.020 |
| Condition of core-exposed section | air | air | air | air | air | air | air | air |
| Length of core-exposed section (µm) | 1500 | 1500 | 1500 | 1500 | 3000 | 3000 | 3000 | 3000 |
| Offset Y (µm) | 0 | 2 | 4 | 6 | 0 | 2 | 4 | 6 |
| Connection loss | 5.2 | 3.7 | 4.3 | 6.5 | 5.1 | 3.7 | 4.2 | 6.4 |
| Index | 4 | 5 | 5 | 4 | 4 | 5 | 5 | 4 |

As is apparent from Tables, connection loss was large in Examples 8 and 24 where the under cladding 12 did not have a bilayer structure.

On the other hand, the connection loss was small in Examples 1 to 7, Examples 9 to 23, and Examples 25 to 56 where the under cladding 12 had a bilayer structure. Especially, the connection loss was small in Examples 1 to 7, Examples 9 to 23, and Examples 25 to 56 where the bilayer structure had a difference in refractive index (n1-n2) of 0.001 or more.

In each of Examples 1 to 7, Examples 9 to 23, and Examples 25 to 32, the product (t×(n1-n2)) of the thickness t of the first layer and the difference (n1-n2) between the refractive index n1 in the first layer and the refractive index n2 in the second layer satisfied from 0.001 to 0.2 µm. Moreover, as shown in Table 6, in both cases of the condition that the core-exposed section 14 is filled with water and the condition that it is filled with air, when the difference (n1-n2) in refractive index between the first layer 12a and the second layer 12b is 0.001 or more, the influence of the offset Y between the core 14 of the optical waveguide 10 and the core 410 of the single-mode optical fiber 400 is small regardless of the difference (n1-n1) in refractive index between the first layer 12a and the second layer 12b.

The present invention is described in detail with reference to specific embodiments, but it is apparent for those skilled in the art that various changes or modifications can be added without departing from the spirit and the scope of the present invention. This application is based upon Japanese Patent Application (No. 2015-154192), filed on Aug. 4, 2015, the contents of which are incorporated herein by reference.

DESCRIPTION OF REFERENCE NUMERALS AND SIGNS

10: Resin optical waveguide
11: Core
12: Under cladding
12a: First layer
12b: Second layer
13: Over cladding
14: Core-exposed section
100: Connector
200: Silicon optical waveguide chip
210: Silicon optical waveguide
220: Core
230: Coating
300: Resin optical waveguide chip
310: Resin optical waveguide
320: Core
330: Under cladding
340: Over cladding
350: Core-exposed section
400: Single-mode optical fiber

The invention claimed is:

1. A resin optical waveguide comprising a core, an under cladding and an over cladding having refractive indices lower than that of the core,
    wherein the resin optical waveguide comprises, at one end side thereof, a core-exposed section at which the over cladding is not present and the core and the under cladding nearby the core are exposed and, of the under cladding, a portion corresponding to the core-exposed section comprises a first layer and a second layer that satisfy the following (1) to (3):

(1) the first layer and the second layer differ from each other in a distance from an interface with the core or an exposed surface of the under cladding, and the first layer is positioned on a near side to these surfaces and the second layer is positioned on a far side from the interface with the core or the exposed surface of the under cladding;

(2) the first layer is positioned within 15 μm in the distance from the interface with the core or the exposed surface of the under cladding; and (3) the first layer and the second layer differ from each other in refractive index, and the first layer has a refractive index higher than that of the second layer, wherein the first layer has a thickness t of 15 μm or less, and wherein the resin optical waveguide has a product $(t \times (n_{1,max} - n_{2,max}))$ of the thickness t of the first layer and a difference $(n_{1,max} - n_{2,max})$ between a maximum value $n_{1,max}$ of the refractive index of the first layer and a maximum value $n_{2,max}$ of the refractive index of the second layer being from 0.001 to 0.2 μm.

2. The resin optical waveguide according to claim 1, wherein the core-exposed section has a length of 100 μm or more in a light propagation direction.

3. The resin optical waveguide according to claim 1, having a difference $(n_{1,max} - n_{2,max})$ between a maximum value $n_{1,max}$ of the refractive index of the first layer and a maximum value $n_{2,max}$ of the refractive index of the second layer being 0.001 or more.

4. The resin optical waveguide according to claim 1, having a difference $(n'_{,max} - n_{1,max})$ between a maximum value $n'_{,max}$ of a refractive index of the core and a maximum value $n_{i,max}$ of the refractive index of the first layer being from 0.008 to 0.02.

5. The resin optical waveguide according to claim 1, wherein the resin optical waveguide is a single-mode optical waveguide at a wavelength of at least one of 1,310 nm and 1,550 nm.

6. The resin optical waveguide according to claim 1, wherein the resin optical waveguide has a core size of from 1 to 10 μm.

7. The resin optical waveguide according to claim 1, wherein the core of the resin optical waveguide is composed of a resin containing fluorine.

8. A resin optical waveguide chip, comprising the resin optical waveguide according to claim 1 connected with a silicon optical waveguide at the core-exposed section of the resin optical waveguide.

* * * * *